(12) United States Patent
Baumann

(10) Patent No.: US 6,272,501 B1
(45) Date of Patent: Aug. 7, 2001

(54) DATABASE SYSTEM FOR MANAGEMENT OF ARRAYS

(76) Inventor: Peter Baumann, Camerloherstrasse 72, D-80689 München (DE)

(*) Notice: Subject to any disclaimer, the term of this patent is extended or adjusted under 35 U.S.C. 154(b) by 0 days.

(21) Appl. No.: 09/025,882

(22) Filed: Feb. 19, 1998

(30) Foreign Application Priority Data

Aug. 30, 1995 (DE) ................................. 195 31 809
May 30, 1996 (DE) ................................. 196 21 788
Aug. 22, 1996 (WO) ................................. PCT/DE96/01583

(51) Int. Cl.[7] ................................................. G06F 17/30
(52) U.S. Cl. ......................... 707/104; 707/1; 707/2; 707/3; 707/4; 707/5; 707/6; 707/9; 707/100; 707/101; 707/102; 707/103
(58) Field of Search ................................. 707/1, 2, 3, 4, 707/5, 6, 9, 100, 101, 102, 103, 104

(56) References Cited

U.S. PATENT DOCUMENTS

| | | | | |
|---|---|---|---|---|
| 5,113,494 | * | 5/1992 | Memendez | 707/1 |
| 5,319,777 | | 6/1994 | Perez | 707/1 |
| 5,740,801 | * | 4/1998 | Branson | 128/653.01 |
| 5,877,819 | * | 3/1999 | Branson | 348/701 |
| 5,915,262 | * | 6/1999 | Bridges | 711/143 |

FOREIGN PATENT DOCUMENTS 44 16 332 A1  12/1994  (DE) .
0 650 131 A1   4/1995  (EP) .

OTHER PUBLICATIONS

IEEE publication, Query Pre-Execution and Batching in Paradise: A Two-Pronged Approach tothe Efficient Processing of Queries on Tape-Resident Raster Images, Yu et al, pp. 64–78, Jan. 1997.

IEEE publication, "Distributing Mapping Objects with the Geospatial Information Database", Chung et a., pp. 77–85, Jan. 1999.

(List continued on next page.)

*Primary Examiner*—Thomas G. Black
*Assistant Examiner*—Diane D. Mizrahl
(74) *Attorney, Agent, or Firm*—Shlsinger, Arkwright & Garvey LLP

(57) ABSTRACT

Database system comprising a storage means for storing encoded and compressed multidimensional array data; a storage interface; an application programming interface; and processing means for effecting a storage and query processing, and for providing processed data to the storage interface or the application programming interface, said processing means comprising an encoder/decoder, a compressor/decompressor, a query processor, a query optimizer and a format converter. The provision of to be stored data to the storage interface through the processing means takes place in a storage format predetermined by an indicator assigned to the data. The provision of to be output data to the application programming interface through the processing means takes place in an output format predetermined by an indicator transmitted via the application programming interface. The storage format and the output format as well as a predetermined internal format of the processing means for the processing of the data are respectively independent from one another.

14 Claims, 7 Drawing Sheets

OTHER PUBLICATIONS

IEEE publication, "Towards a Visual Query Language for an Object Oriented Geographical Information System", Jungert, pp. 132–137, Jan. 1990.

IEEE publication, "Extracting Area Objects from Raster Image Data", Riekert, pp. 68–73, Mar. 1993.

IEEE publication, Raster–Spatial Data Declustering Revisited: An Interactive Navigation Perspective, Chen et al., pp. 600–607, Jan. 1997.*

Vandenberg, S.L., "Algebraic Support for Complex Objects with Arrays, Indentity, and Inheritance", 1991 ACM 0–89791–425–2/91/0005/0158, pp. 158–167 (1991).

Meyer–Wegener, Lum, Y. and Wu, C.T., "Image Management in Multimedia Database System", Visual Data System, IFIP, 1989, pp. 497–523.

Takamura, H., "Image Database Management for Pattern Information Processing Studies", Electrotechnical Laboratory, Japan, pp. 198–227 (No date).

Baumann, Peter"Database Support for Multidimensional Discrete Data", Fraunhofer Computer Research Group, pp. 191–206 (No date).

Baumann, Peter "Management of Multidimensional Discrete Data", VLDB Journal, 401–444 (1994).

Guitng, Ralf Hartmut, "An Introduction to Spatial Database Systems", VLDB Journal, 3, 357–399 (1994).

Sarawagi, S. and Stonebraker, M., "Efficient Organization of Large Multidimensional Arrays", National Science Fondation. (pp. 1–3) (No. date).

Postgres–kostenloses RDBMS mit objektroientierten Erweiterungen "Evolution Contra Revolution", Ekard Burger, IX Oct. 1993, pp. 72, 74, 76, 78, 80 and 81. (Review: Daten banksystem).

Advances in spatial databases. Third international symposium, SSD '93 proceedings of symposium on large spatial databases (SSD '93), Singapore, Jun. 23–25, 1993. (Prior art not submitted only Search Report)(Considered).

* cited by examiner

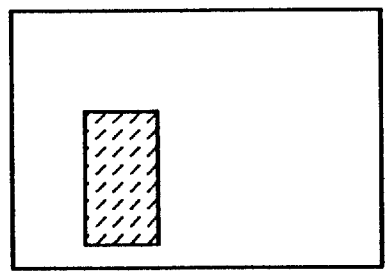
FIG. 3A
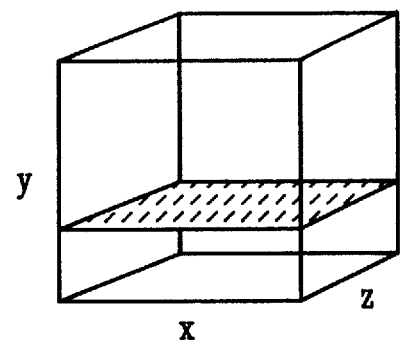
FIG. 3B
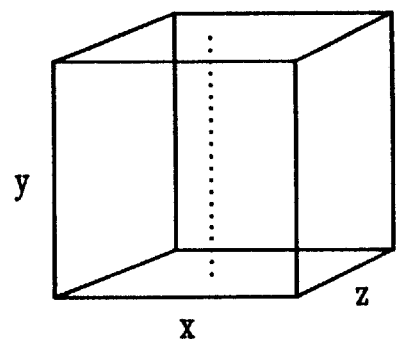
FIG. 3C
FIG. 4
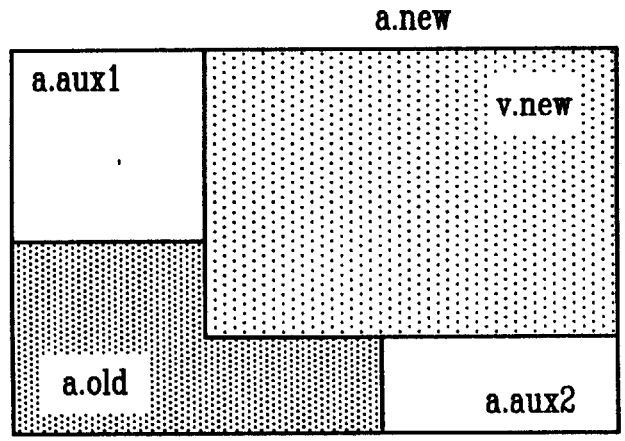

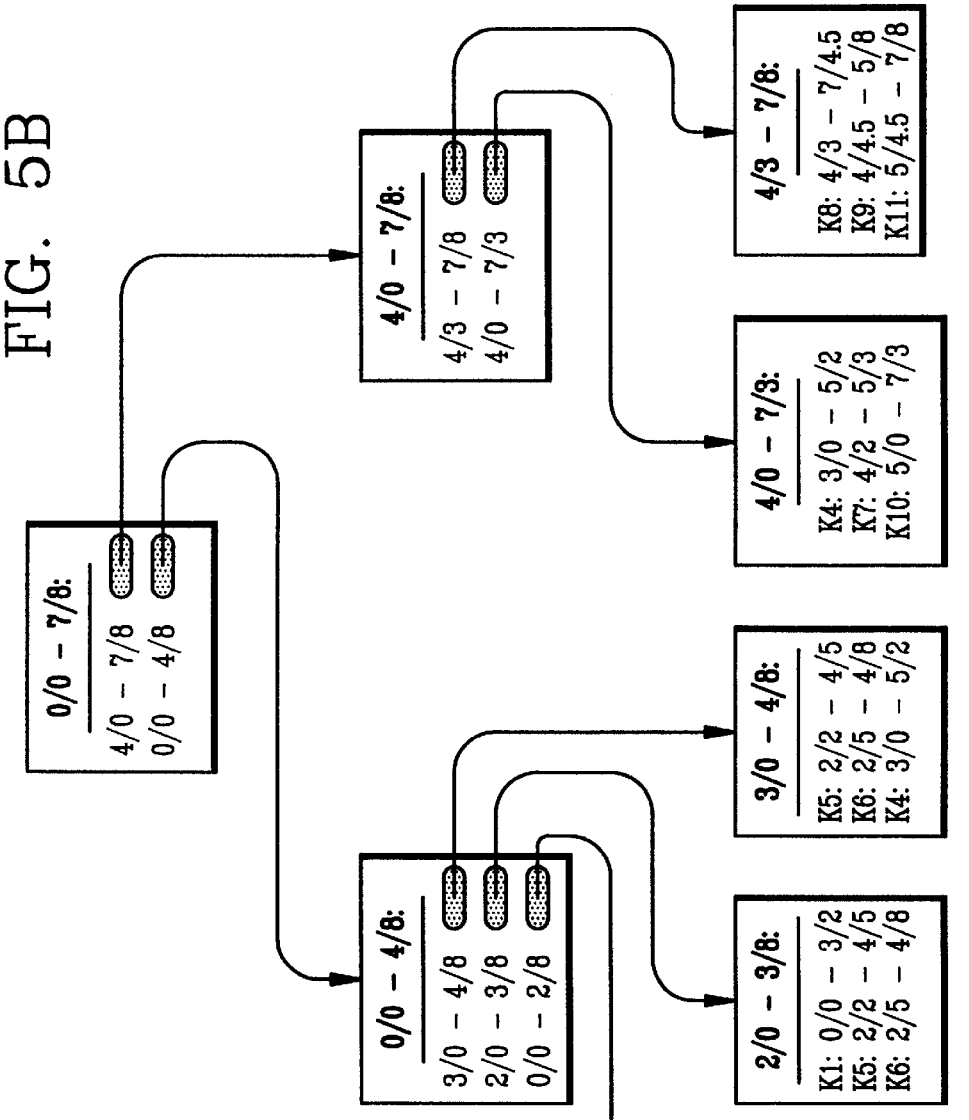
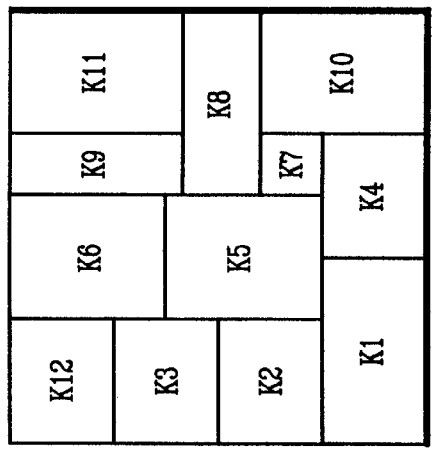
FIG. 5B
FIG. 5A

DATABASE SYSTEM FOR MANAGEMENT OF ARRAYS

FIELD OF THE INVENTION

The invention relates to an application- or domain-independent database system (DBS) for the storage, retrieval, and manipulation of raster data, i.e. arrays of arbitrary (fixed or variable) size and number of dimensions over arbitrary array base types.

BACKGROUND OF THE INVENTION

This invention pertains to a domain-independent database system (DBS) to store, retrieve and manipulate arbitrary arrays in databases. The term array is understood here in a programming language sense: A fixed-length or variable-length sequence of similarly structured data items (cells, in computer graphics and imaging often called pixels) addressed by (integer) position numbers. The cells themselves may be arrays again, so that arrays of arbitrary dimensions can be constructed.

DBSs have a considerable tradition and play an important role in the storage, retrieval and manipulation of large amounts of data. To this end, they offer means for flexible data access, integrity and consistency management, concurrent access by a plurality of users, query and storage optimization, backup and recovery, etc. For communication between database application (client) and database program (server) various techniques exist, which, for example via function libraries (Application Programmer's Interface, API) which are tied to the application, effect a network data communication including a data conversion invisibly for the application.

However, these advantages are, as yet, only available for data items such as integers and strings, as well as, for some while now, for so-called long fields or blobs (binary large objects), i.e. byte strings of variable length. As for general raster data (for example audio (1D), raster images (2D) and video (3D)), current practice is to regard them as bit strings and to map or project them onto linear blobs; for example in Meyer-Wegener, K. Lum, W. and Wu, C., *Image Management in a Multimedia Database,* Proc. Working Conference on Visual Databases, Tokyo, Japan, April 1989, Springer 1989, pp. 29–40, the authors first state that "raw image data form a matrix of pixels" and then conclude that "the raw data appear (in the database) just as a string of bits".

Due to this loss of semantics through the FORTRAN-type linearisation in the database, raster data can only be read or written as a whole or in a line-by-line fashion. Raster structures cannot be given in search criteria and cannot be processed by the DBS, for example to extract only relevant parts. Moreover, the application must choose one of a plurality of existing data formats for encoding and compression. This choice is compulsory for all other database applications having access thereto, and they alone must ensure the correct decoding and the decompression. Thus, the database application programmer is burdened with a multitude of low-level (near-to-machine), repetitive, error-prone and time consuming programming tasks.

Furthermore, linearisation of arrays in secondary and tertiary storage destroys the neighboring relationships (locality) between array elements, as shown in FIG. 2. A cut-out, which conveys a high degree of locality on a logical level, is disposed on the background storage in a way which favors only line-by-line access and puts all other access means at a drastic disadvantage. The consequence is an inadequate response time behavior.

A typical system is described in Meyer-Wegener, see id. Raster images are provided in the database as blobs, encoded in one of various possible image exchange formats (for example TIFF or GIF); an additional flag indicates to the application the presently used format. The EXTRA/EXCESS-system, Vandenberg, S. and DeWitt, D., *Algebraic Support for Complex Objects with Arrays, Identity, and Inheritance,* Proc. ACM SIGMOD Conf. 1991, pp. 158–167, offers an algebra for modeling and querying raster data, but there is no accompanying appropriate storage technique, so that only small arrays (for example 4×4-matrixes) can be efficiently managed. Sarawagi, S. and Stonebraker, M., Efficient Organization of Large Multidimensional Arrays, Proc. 10th Int. Conf. on Data Engineering, February 1994, recently proposed a storage architecture for arrays based on tiling (see below), but without a spatial index for access acceleration and without optimizable query support next to the pure cut-out formation. In Baumann, P., On the Management of Multidimensional Discrete Data, VLDB Journal 3(4) 1994, Special Issue on Spatial Databases, pp. 01–444, an approach for raster data management is proposed, which concerns the conceptual as well as the physical level. A general solution for the problem of data independence, i.e. the processing of raster data in a DML or API without knowledge and reference of/to its physical storage structure, encoding and compression, does not exist at the moment. However, from Baumann, P., *Database Support for Multidimensional Discrete Data,* ISBN 3-540-56869-7, pp. 191–206, it is known to store additionally to the data also an indicator of the compression used.

In imaging, tiling techniques are used for the processing of images, which, due to their size, do not fit into the main memory as a whole (for example, Tamura, H., *Image Database Management for Pattern Information Processing Studies;* Chang, S. and Fu, K. (eds.), Pictorial Information Systems, Lecture Notes in Computer Science Vol. 80, Springer 1980, pp. 198–227). A tile is a rectangular cut-out of an image. The image is decomposed into tiles, so that these do not overlap and together cover the image (see FIG. 5A). Within a tile, data are stored using a conventional linearisation scheme. Tiling can be advantageously used in order to simulate neighbourhood/vicinity within an array on a linear storage medium, and thus forms an important basis for the present invention.

For the management of geometric data such as points, lines and areas, many spatial indices (geo-indices) exist in order to accelerate access to such data elements in a database, Gueting, R. H., *An Introduction to Spatial Database Systems,* VLDB Journal 3(4) 1994, Special Issue on Spatial Databases, pp. 357–400. In the present invention, such a geo-index is used for fast tile location.

SUMMARY OF THE INVENTION

The present invention describes a DBS for raster data which performs:

Management of the full semantics of arbitrary arrays.

Declarative storage, retrieval and processing/manipulation of raster data on the semantic level of arrays.

Data independence: the presentation of array data by the DBS is explicitly chooseable by the application in a multitude of different data formats, independently from a database-internal storage format, encoding and compression.

A storage technique which allows an efficient management of very large arrays, which may stretch across a plurality of possibly heterogeneous storage media.

Storage and query optimization.

The invention is characterized by a strict separation of logical (conceptual) and physical level to achieve data independence, i.e. to address raster data independently from their physical data structuring (storage structure), encoding, and compression. Depending on the data format requested by the application, the DBS transparently effects the necessary conversion and (de-)compression taking into account access and transfer optimization issues.

On the conceptual level, the explicit definition of array structures via a data definition language (DDL) provides the DBS with the knowledge concerning the complete array semantics. An orthogonal query language (DML) contains array-specific primitives and operators which can be combined arbitrarily to form optimizable DML-expressions and—predicates. Standard functions allow for explicit format conversion.

On the physical level, a storage architecture based on the combination of array tiling and a spatial access structure (geo-index) allows for the efficient access to arrays and array cut-outs as well as the distribution of an array over several, potentially heterogeneous storage media.

The invention is particularly suited for raster applications which have demanding requirements with respect to functionality, data volumes, network capability and access time—in particular distributed, open multimedia systems.

A DBS according to the present invention is especially suited for raster applications which have demanding requirements with respect to functionality, data volumes, network capability and access time (response time behaviour). Among the more prominent application areas are distributed open multimedia systems, medical imagery/PACS/hospital information systems, geographical and environmental information systems (GIS/EIS) as well as scientific visualization (mechanical engineering, meteorology, hydrology, astronomy). In detail, the following advantages can be achieved:

- Application or domain independence: array-specific data structures and operations can be combined arbitrarily with conventional definitions, expressions and predicates; this way, a DBS according the invention can be used for a plurality of application domains.
- Data independence: DBS functionality is available on arbitrary platforms and networks and independently from a specific data format or a specific set of data formats.
- Database application programmers are relieved from low level, repetitive, error-prone and time consuming tasks, in that uniform standard solutions are provided by DBS.
- Less resource consumption due to the tailored/modified storage architecture and a declarative, optimizable query language; especially, the response time behavior depends on the query result, and not on the overall data volume on which the query is performed.
- Transparent integration of storage media (for example hard disk, jukebox, tape archives) for data sets of arbitrary size, in particular for arrays spanning several data carriers.
- Classic database services such as transaction support, integrity maintenance and recovery become available for raster data.

BRIEF DESCRIPTION OF THE DRAWINGS

FIG. 2 shows a destruction of spatial locality/neighborhood through linearisation in connection with storage projection, shown for the example of an array cutout formation (circles denote cells selected by the cutout, dots represent cells not included by the query).

FIG. 3 shows a visualization of the effect of sample queries on arrays (selected areas are shown with shaded lines).

FIG. 3A shows a trim operation, applied to a 2-D array.

FIG. 3B shows a projection along the x/z-plane of a 3-D array, yielding a 2-D array.

FIG. 3C shows a projection along the y-axis of a 3-D array; yielding a 1-D array.

FIG. 4 shows an extension of a variable 2-D array during assignment.

FIGS. 5A and 5B shows a raster storage management by means of a combination of tiling and spatial index (geo-index), example of storage of a 2-D array.

FIG. 5A shows a factoring of a 2-D image into tiles.

FIG. 5B shows a spatial index (geo-index) of the tile-factoring in FIG. 5A.

DETAILED DESCRIPTION OF THE INVENTION

Figure 1:
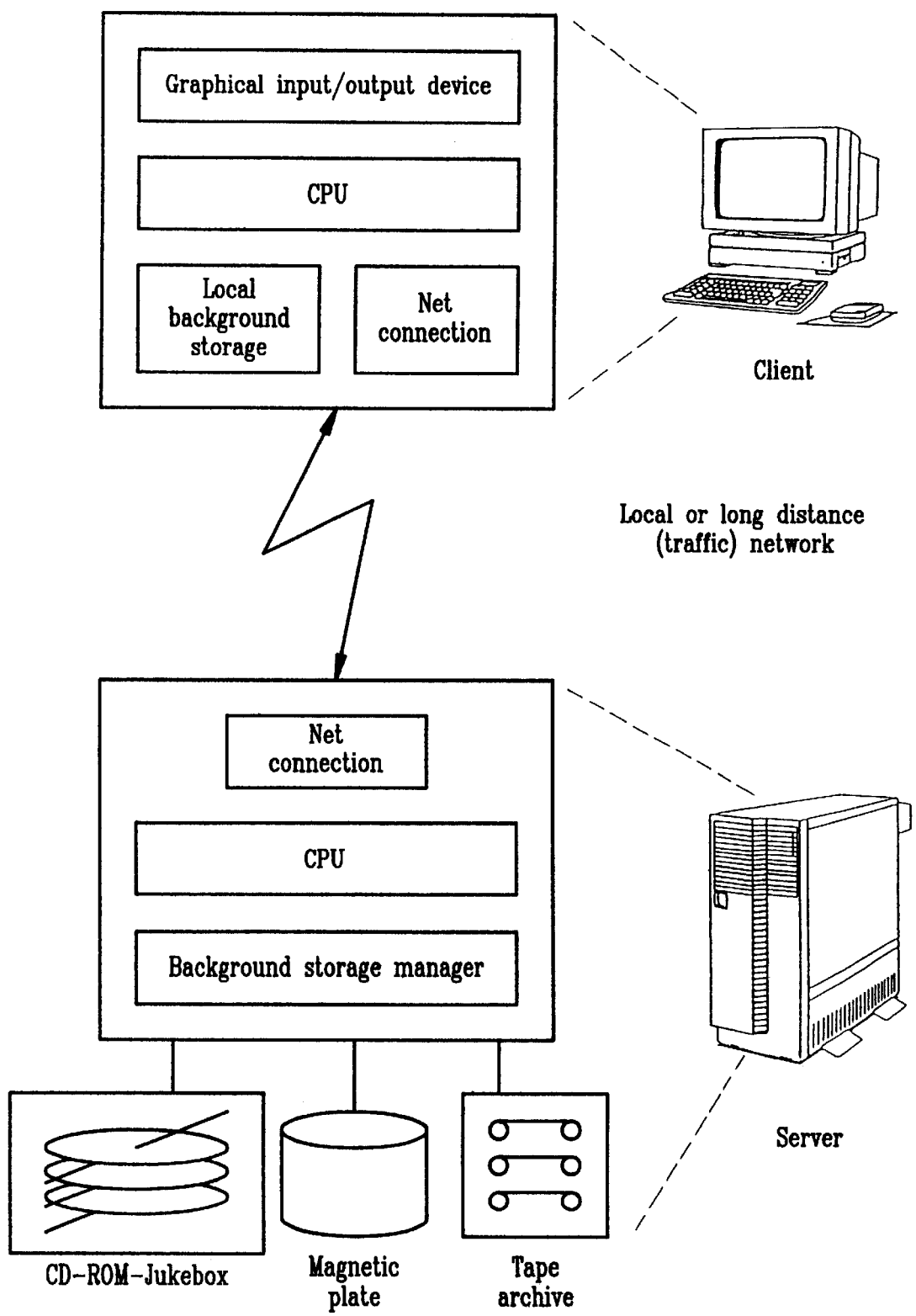
FIG. 1 shows a schema tical structure of an arrangement according to the invention: One or more computers on which raster data applications are provided are, via a local or long distance net, connected with the server on which the raster DBS is provided.
Figure 2A:
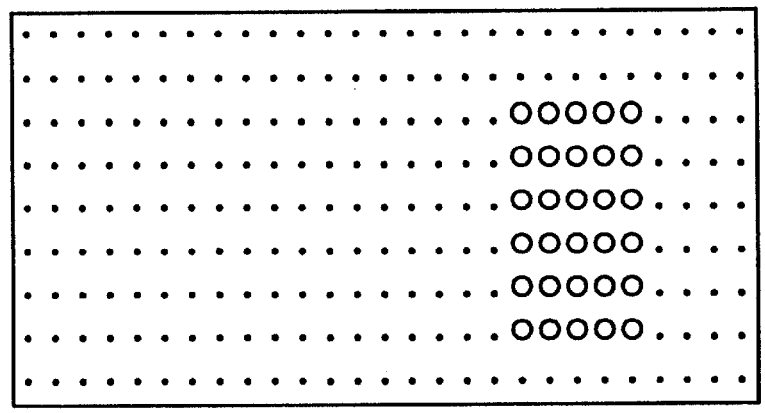
FIG. 2A shows a 2-D image with marked cutout (logical view).
Figure 2B:
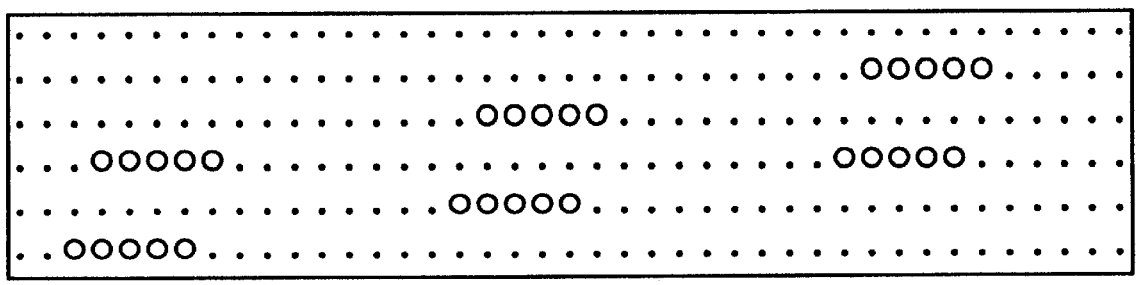
FIG. 2B shows a linearized image with scattered parts of the selected cutout.

The present invention is now described with reference to a specific, suitable embodiment. However, the invention is not limited to this embodiment. Rather, many variations and modifications are possible, without leaving the domain of the invention as described below in the claims or their equivalents.

Raster Semantics

In the following, the C++ type DDL of an object-orientated DBS is used; for the example queries, an SQL type DML is used. It is obvious, how the underlying concepts are transferable to other models and systems. The invention is in no way limited to a specific syntax, programming language, operating system or a specific database paradigm.

Structure definition

The conceptual scheme is described referring to an example mini-world, stemming from the field of sensor fusion in environmental information systems. Three object classes SeismicSensor for variable-length 1-D-time series, LandsatTM for Landsat-TM-satellite images in the format 7020×5760 (2-D) and WeatherSimulation for atmospheric temperature distributions in a 1000×1000×1000 area (3-D) are defined below; the simple # denotes a variable number of cells in the specified dimension:

```
class SeismicSensor: public PObject
{
public:
        Coordinate    location;       // geographical position of sensor
        unsigned      data [ # ];     // sequence of measured data
};
class LandsatTM: public PObject
{public:
        Orbit         orbitalData;    // orbital parameter
        Aperture      aperture;       // aperture
        struct {unsigned short c1, c2, c3, c4, c5, c6, c7;}
                      data [7020] [5760]; //7-band-image data
};
class WeatherSimulation: public PObject
{
public:
        float         data [1000] [1000] [1000]; //temperature data
};
```

Operations

The array operations can be grouped into value based operations, update operations and general constructions/ principles. The following value based operations are suggested:

Constants. For use in query expressions or to initialize an array, cell values can be indicated explicitly or implicitly. Example: "A 2×2 integer array with all cells zeroed." This is indicated by a direct listing, the array structure properly reflected here through curly braces:

{{0, 0}, {0, 0}}

Implicit definition is done through some descriptive statement of the kind

{0: [1024] [768]} in this case stating "A 1024×768 image with all cells zeroed".

Trimming produces a rectangular array cutout. For example, the query "The subarray of all Landsat TM images which is given by the corner points (x0,y0) and (x1, y1)" (see FIG. 3A) is phrased as

```
select  1.data [ x0 .. x1 ] [ y0 .. y1 ]
from    LandsatTM 1
```

Projection extracts a layer of thickness 1 from an array (cf. FIG. 3B). For example, "air temperature distribution over the whole simulation area at height over ground h" is stated as

```
select  W.data [ # ] [ h ] [ # ]
from    WeatherSimulation w
```

Induced operations. For each operation available on the array base type (e.g., subtraction on greyscale pixels), a corresponding operation is made available, which applies the base operation simultaneously to all array cells (e.g. subtraction of two greyscale images). Example: "The c3 channel of all Landsat TM images, reduced in intensity by the value d".

```
select  1.data.c3 - d
from    LandsatTM 1
```

Predicate iterators. The raster predicate some(p) yields true if and only if at least one cell of a Boolean array p contains the value true. Correspondingly, the raster predicate all (p) returns true if and only if all cells of p contain true. Example: "The location of all seismic sensors where earthquake activity has exceeded t at some time in the past."

```
select  s.location
from    SeismicSensor s
where   some ( s.data > t )
```

Next, the update operations are listed.

Initialization. This operation, which is implicitly invoked upon every creation of an array as part of for example a tupel or an object, sets all cells to zero values and the length of variable arrays to zero.

Assignment. Through an assignment, the cells in an array or part of an array receive new values. If the array is variable and the cell positions to be occupied do not all lie within the already existing array, the array is extended appropriately. For instance, in FIG. 4, the old array a.old is extended by array part v.new which only partially overlaps a.old. Hence, a.new is formed as an extended array, made a rectangle by introducing two newly created areas, a.aux1 and a.aux2, filled with zero (null) values.

Finally, general construction principles are listed which are important regarding flexibility and generality of the invention.

Orthogonal query language. The operations listed above preferably are embedded in a declarative DML which describes what shall be done and not how to do it, thereby clearing the way for intelligent optimization. Expressions and predicates are (recursively) formed using the aforementioned array basic operations, the well-known Boolean operators, parentheses, functional nesting and, under certain circumstances, the calling of further functions/methods.

EXAMPLE 1

"The temperature distribution in a height h of all simulations, in which at any point in the area marked by the corner points (x0, y0, z0) and (x1, y1, z1) the temperature t is exceeded." Trimming in three dimensions is here combined with the induced comparison and of the collaboration or collapsing into a single Boolean value by the "some"-operator:

```
select  w.data [ # , h , # ]
from    WeatherSimulation w
where   some (w.data [x0 .. x1] [y0 .. y1] [z0 .. z1] > t)
```

EXAMPLE 2

"The Landsat-TM-images which contain regions of observed seismic activity, as well as the corresponding sensor positions". Here, in addition to the raster operation, geometrical operations area() and contains as well as parenthesizing/nesting are used:

```
select   l.data, s.location
from     LandsatTM l, SeismicSensor s
where    area (l.orbitalData, l.aperture) contains s.loca-
         tion and some ( s.data > t )
```

Data independence. Raster data are presented to the application program as generic arrays; the functionality, which is offered on arrays, is independent of their physical structure in the database. In case now further specifications take place, data pass the DBS-interface in the main memory representation of the goal machine and the programming language of the application, for example as C++ array, so that a direct further processing by means of the application programming language is possible; this representation is called the direct representation of an array with respect to a specific goal environment. Alternatively hereto, the database application can explicitly request a different representation by means of functions offered by DBS (for example JPEG to exploit hardware support on the client side). All conversions and compressions or decompressions which become necessary due to differences in DBS-internal storage format and the format necessary for the application, are performed DBS-internally and invisibly for the application. If, for example, a TIFF-encoding is requested (provided TIFF is applicable to the array structure present) the built-in function tiff( ) is requested (called). Example: "All Landsat-TM-images in TIFF-format":

```
select tiff (LandsatTM.data)
```

Like most other image data formats, TIFF includes further so-called registration data: These are set to zero values by DBS.

In case of JPEG, the percentage of quality reduction must additionally be supplied, as JPEG performs a compression with selectable data loss:

```
select jpeg (LandsatTM.data, 25)
```

The database-internal representation is not known to the application; it can, but must not be one of these formats. If the internal format does not match the requested format, the query processor generates the necessary conversion code.

System Architecture

Figure 8:
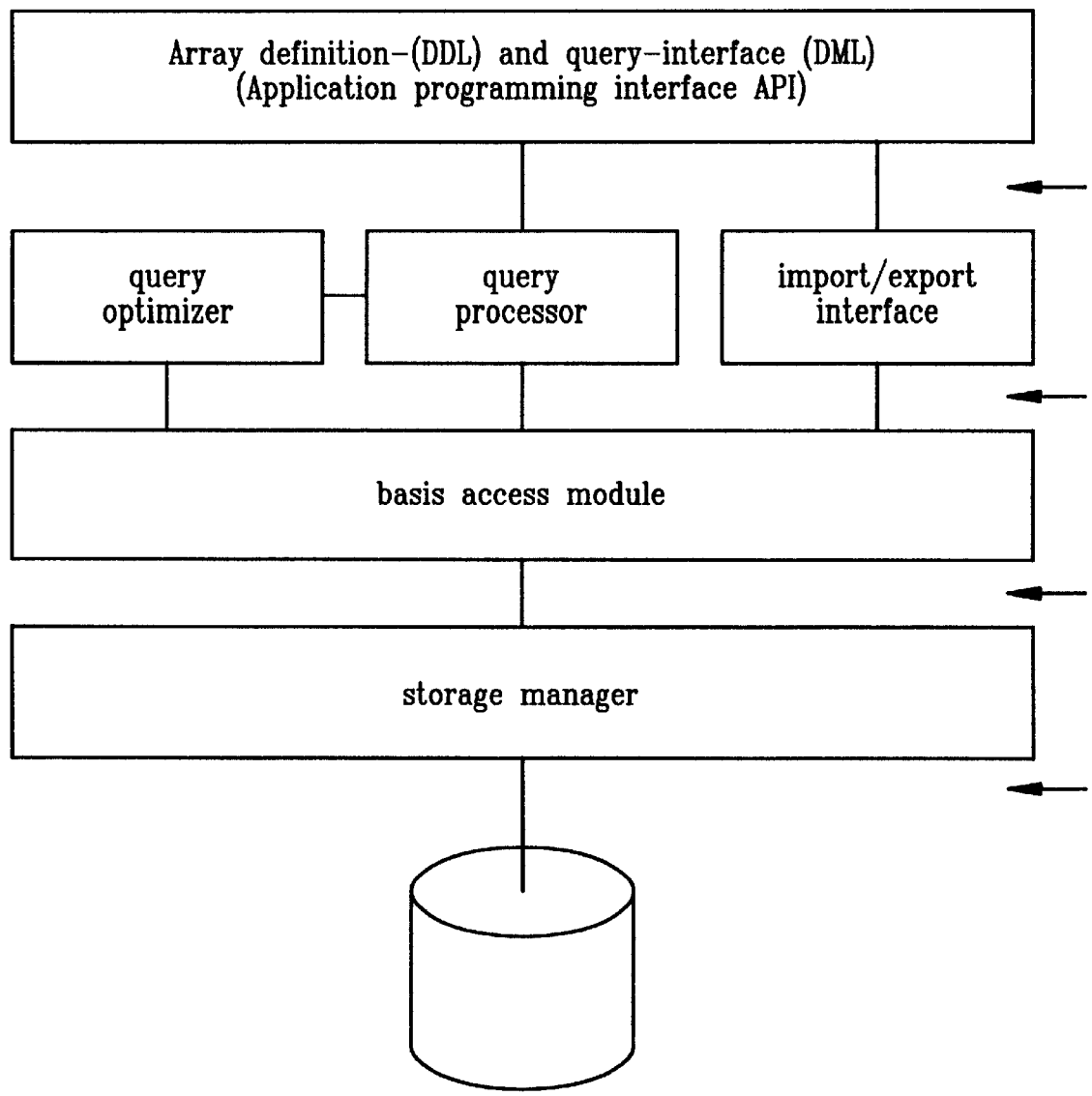
FIG. 8 shows a system architecture of a raster database system according to the present invention. The internal interface marked by arrows are especially suitable for interconnection of network communication.

Preferably, a hardware architecture as shown in FIG. 1 and a software architecture as shown in FIG. 8 are used for a raster DBS. The application interface (API) provides two basic ways of access: The query processor offers the definition and manipulation of arrays as described above; in particular, it establishes a query execution plan. The raster import and export facility serves as a bulk data interface (bulk loader) in case arrays as a whole are imported or exported. This special case of raster data access requires only very simple operations, but a very efficient execution, wherefore it is advantageously separately supported. The query optimizer attempts to rearrange the execution plan, so that various quality-of-service-criteria, e.g. number of disc accesses, compression/decompression effort or overhead, and network load (network traffic) are optimized. The basic access module forms the virtual machine, on which the query processor executes the execution plan (query plan). Here, tiles are loaded, the requested contents are extracted therefrom, induced operations are performed and the query result is prepared and converted into the requested data format. The storage manager processes complete tiles, for which writing and reading primitives are offered. In order to speed-up tile determination a geo-index is maintained internally.

Within a tile a conventional linearisation or any arbitrary storage mapping is performed. The storage manager is based on an interface which offers persistent, directly addressable data areas of specified or variable length without further semantics.

It is possible—however not necessary—to place a conventional DBS (for example relational or object-oriented) under the storage manager, in order to utilize transaction, recovery and further base (basic) mechanisms. In this case the underlying DBS serves as persistent storage manager which manages tiles and/or index records for example in blobs, without having specific knowledge of the semantics. For example, in a relational DBS a relation Tiles can be defined which holds the tiles of all arrays, regardless of their dimension:

```
Tiles (oid:integer, tid:integer, c_e:integer, tile:long)
```

Herein, oid is the object identifier of the array, tid is the tile identifier, in c_e the respective tile encoding and compression is indicated, and tile contains the tile data themselves.

It should be noted that at each place in this architecture network communication can take place; in particular, array construction from tiles and array decomposition into tiles as well as compression and decompression can be shifted from the server to the application machine (client machine). However, strict transparency should be maintained.

Query Processing

In the following, a DML-language embedding in C and a simplified API-function dbCall( ) is utilized in order to describe the basic principles of query processing. In order to provide the above described functionality in full, more complicated interface-techniques are necessary which are for example state of the art in relational DBS. Encoding/compression is always to be understood starting out from the main storage format. Decoding/decompression is always performed into the main storage format of the respectively used platform. Therefore, each array comprises an indicator stating its present data format. It is stored in the database together with the tile; at the API, it is either explicitly set by the application, or produced implicitly by the preprocessor during source code analysis.

For the description of the method it is presumed that network communication takes place between the database server on the one side, and the database API and the application on the other side, which, with heterogeneous platforms, makes necessary a transmission encoding. Herein a compression can be performed in order to reduce the communication volume. The methods utilized for compression and for encoding of arrays are not further specified as they are not subject matter of the present invention; arbitrary methods may be used.

The communication via network can be performed at the stated place in the system architecture, can be omitted or can be performed between other DBS components (see the arrows in FIG. 8), wherein the encoding must take place on the respectively occurring units (for example tiles).

Retrieval

For the query "The Landsat-TM-cutout between (50,100) and (100,200), therefrom channel c3" the following piece of C-code is formulated in the application program:

```
{
short landsatPart[51] [101];
select l.data.c3[50. .100] [100. .200]
from  LandsatTM l
```

-continued

```
into    :landsatPart:
}
```

The two double crosses ## make known the statements to the preprocessor, which generates database-API-calls from this source code. These are supplemented by information concerning data format. Program variables are marked herein by a prepositioned colon which is filtered out by the preprocessor during code creation:

```
{
    short landsatPart[51] [101];
    dbCall  ( "select 1.data.c3[50. .100] [100. .200]
              from LandsatTM 1 into :1",
              landsatPart,
              CLIENT_INTERNAL-FORMAT );
}
```

The first dbCall( )-parameter is the query string, as transmitted to the query processor; the variable name in the into-clause is replaced by a position indicator for the first (and here only) result parameter landsatpart. The second parameter is a pointer to the result array, in which the query result is placed by the API. The third parameter signals to the API, whether the result array is to be delivered in the direct representation of the application (CLIENT_INTERNAL_FORMAT) or in a data format specified in the query (EXTERNAL_FORMAT); based on the format indicator CLIENT_INTERNAL_FORMAT as final parameter the API will, after completion of the query processing by the DBS, make available the query result in the program variable landsatPart in the direct representation of the application.

If the query result is to be delivered in another data format known to the DBS, the application makes this known by calling the corresponding conversion function, for example by calling a standard function jpeg( ) for JPEG-coding with a 25% reduction:

```
{
char landsatPart [JPEG_STRING_SIZE];
select jpeg( 1.data.c3[50. .100] [100. .200], 25 )
from   LandsatTM 1
into   :landsatPart;
}
```

Herefrom, the preprocessor generates

```
{
    char landsatPart[JPEG_STRING_SIZE];
    dbCall   ("select jpeg(1.data.c3[50. .100] [100. .200],
)\
            from LandsatTM 1 into :1',
            landsatPart,
            EXTERNAL_FORMAT );
}
```

Thus, the API provides the array generated by the server in the program variable landsatPart JPEG-encoded.

Figure 6:
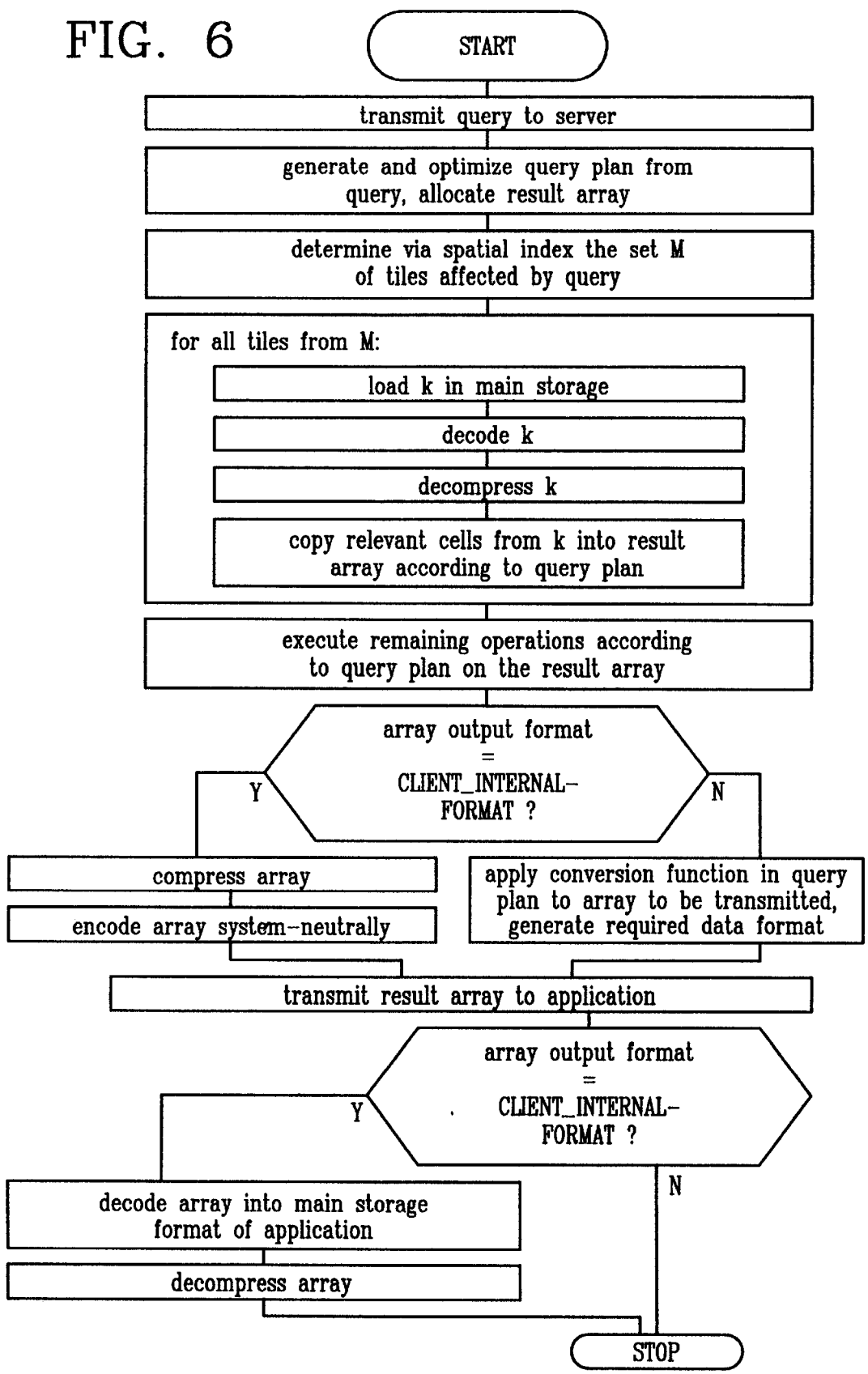
FIG. 6 shows a retrieval-algorithm as flow-diagram.

During execution of such database requests the further processing of the query according to above architecture is performed after the following algorithm (FIG. 6):

1. transmit query to server;
2. generate and optimize query plan from the query;
3. allocate result array;
4. using the geo or spatial index determine the M set of the affected tiles;
5. for all tiles $k_i$ from M:
   5.1 load $k_i$ in the main storage;
   5.2 decode $k_i$ according to encoding information of the tile;
   5.3 decompress $k_i$ according to encoding information of the tile;
   5.4 copy relevant cells from $k_i$ according to query plan into the result array;
6. perform remaining operations according to query plan on the result array;
7. in case the direct representation of the application is requested for the result array:
   7.1 compress the array;
   7.2 encode the array;
8. transfer result array to application;
9. in case the direct representation is requested for the result array:
   9.1 decode the array into the main storage format of the application;
   9.2 decompress the array;

In step 1 the query is transmitted from the client to the server. In the next step the retrieval plan is generated by the query processor and the optimizer. In step 3 storage space for the query result is provided in the server. The storage manager determines, in step 4, the set of affected tiles from the query plan with the help of the spatial (geo) index. Controlled by the query processor, the basis access module loads these tiles one after the other (5.1), expands them (5.2) and decompresses them (5.3) into the direct representation of the server and copies the relevant cutout in the result array (5.3); in steps 5.2 and 5.3 the information stored with each tile, according to which method the tile contents were encoded and compressed, is utilized (see section 5.2). Possible further directions from the select-part of the query are performed by the basis access module in step 6; inter alia this comprises a transformation of the result, possibly requested by the application, into a format which differs from the direct representation of the application.

In case the result array is encoded in such a data format, it is regarded in all following steps as a bytestring without further semantics and transferred to the application in step 8, i.e. steps 7 and 9 are omitted. Otherwise, the array, which is provided in the direct representation of the server, is compressed on the semantic level of the array (also utilizing the structure knowledge) and encoded (step 7), and, on the application side in the API, again decoded and decompressed (step 9). Thus, the result array finally is provided in the storage area specified by the application either in the direct representation of the application or in the other requested data format.

Update

The following query shall serve as an example: "Replace in all Landsat-TM-images in channel c3 in the area between (51,101) and (100,200) the values by array e". The corresponding piece of C-code reads:

```
{
short e[51] [101];
update  LandsatTM
set     data.c3 [50 . . 100] [100 . . 200] = :e;
}
```

Therefrom the preprocessor generates

```
{
    short e[X_SIZE] [Y_SIZE];
    dbCall("update LandsatTM set data.c3[50. .100] [100. .200]
= :1",
            e
            CLIENT_INTERNAL_FORMAT );
}
```

The first parameter of the query string (the variable name is again replaced by a position indicator) is followed by the program variable e with the input array. In view of the format indicator CLIENT_INTERNAL_FORMAT as last parameter, the API expects a direct representation of the data in e.

If the input data are provided in another format known to DBS, the application makes this known by calling the corresponding conversion function, for example by calling a standard function inv_jpeg( ) for JPEG-decoding:

```
{
char e[JPEG_STRING_SIZE];
update   LandsatTM
set      data.c3 [ 50 . . 100 ] [ 100 . . 200 ] =
inv_jpeg( :e);
}
``` and therefrom the preprocessor generates

```
{
    char e[JPEG_STRING_SIZE];
    dbCall("update LandsatTM set data.c3[50. .100] [100. .200] =
        \ inv_jpeg( :1 )",
        e,
        EXTERNAL_FORMAT );
}
```

The API transfers the contents of e to the server, so that a JPEG-encoded array arrives therein.

Figure 7:
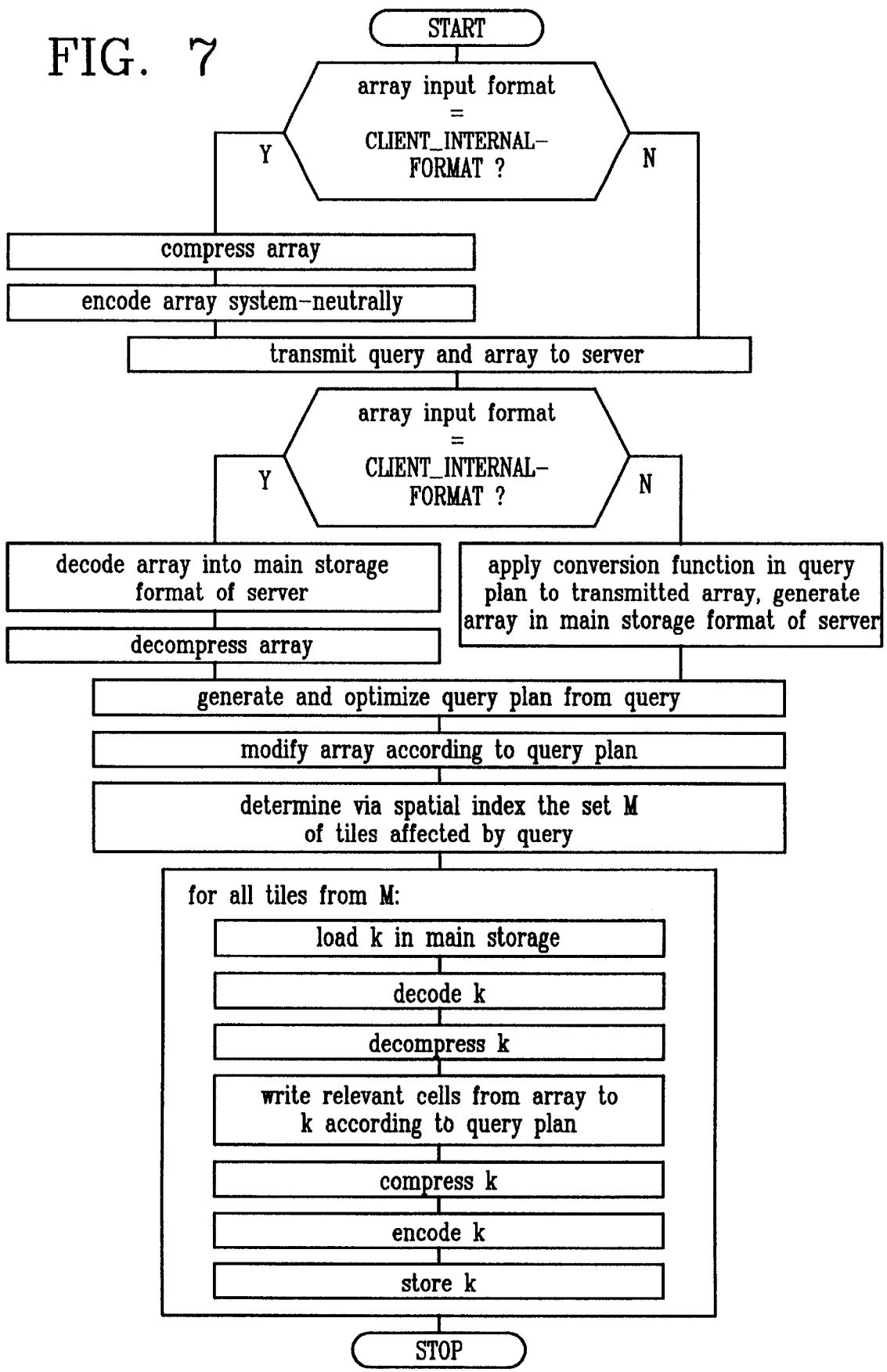
FIG. 7 shows an update-algorithm as flow-diagram.

The further execution by the DBS is performed, according to above architecture, after the following algorithm (see FIG. 7):

1. in case the input array is provided in direct representation of the application:
   1.1 compress the array;
   1.2 encode the array;
2. transfer query and input array to server;
3. in case the input array is provided in the direct representation of the application:
   3.1 decode the array;
   3.2 decompress the array;
4. generate and optimize query plan from the query;
5. modify input array according to query plan;
6. determine by means of spatial index the set M of the affected tiles;
7. for all tiles $k_i$ from M:
   7.1 load $k_i$ in the main storage;
   7.2 decode $k_i$;
   7.3 decompress $k_i$;
   7.4 write relevant cells from the input array to k;
   7.5 encode $k_i$;
   7.6 compress $k_i$;
   7.7 store $k_i$.

In case the input array is provided in the direct representation of the application, it is converted in step 1 by means of a method for the array compression and encoding into a system-neutral format, in step 2 it is transmitted, together with the query, to the server and there transformed into the direct representation of the server (steps 3.1 and 3.2). If the input array is provided in a different format, it is regarded as a byte string without further semantics during transfer and transferred to the server in step 2.

In step 4 the query is translated into the internal query plan and optimized. During execution, in step 5, modifications specified in the query are first performed on the input array; inter alia the input array, if it is provided in encoded form, is transformed into the direct representation of the server by application of the conversion function specified in the query.

From the trim information in the query the storage manager determines, in step 6, by means of the spatial index the affected tiles which, in step 7.1, are loaded by the storage manager and transmitted to the basis access module. Controlled by the query processor, this expands the tiles (steps 7.2 and 7.3) depending on the encoding information with each tile, updates the tiles with the relevant cells from the expanded input array (7.4), transfers the tiles back into the storage format predetermined by the tile indicator (steps 7.5 and 7.6) and finally transfers them back to the storage manager for rewriting into the database (7.7).

Essential Thoughts Concerning the Invention

1. A DBS for the management of arrays. The DBS can be implemented as an individual system or as a component of a further DBS.
2. The DBS with the ability to manage arrays
   of an arbitrary number of dimensions
   an arbitrary, possibly variable number of cells per dimension
   over arbitrary basis types.
3. Logical level:
   The DBS comprises a DDL for structure definition of arrays.
   The DBS comprises a DML in the usual database sense, which renders possible the processing of arrays by means of arbitrary expressions and predicates (possibly mixed with such ones over conventional data types).
   Data independence of raster data: the presentation of array data by the DBS is independent of the database-internal storage format, the encoding and the compression as well as the programming language, operating system and hardware of client and server. The application (client) can choose, which format the raster data shall have; the machine internal main storage representation in the application as well as an arbitrary number of data exchange formats can be chosen.
4. Physical level:
   The DBS uses a combination of n-dimensional tiling technique and a n-dimensional spatial index in order to achieve a fast and efficient management of arrays of arbitrary size and dimension.
   Each tile can be stored individually on an arbitrary storage medium, so that the DBS can distribute an array over an arbitrary number of possibly heterogeneous data carriers, without this becoming visible for the application.
   The DBS can utilize a number of compression methods internally, in order to optimize the storage and transmission of raster data, without making the compression/ decompression visible for the application.
   By means of an indicator, which is stored with each tile, the encoding and compression for each tile can be determined individually; especially, different tiles of the same array can be treated differently.
   Each array in the main storage (with the DBS server or in the API on the client side) comprises an indicator for the encoding/compression in which it is provided; this indicator is essential in order to offer arbitrary data formats on the API level, i.e. to realize data independence.

Based on the data definition, the storage organization as well as other useful information, a query optimizer can reorganize the execution plan of a query according to a multitude of methods, so that to the quality of service criteria like CPU-load, storage access, net load and response times can be optimized.

As possible implementations tiles can be projected onto attributes of another DBS (for example relational or object orientated) in such a way that each tupel or each object comprises a tile (additionally possible management information). Thus, classic data bank features such as transaction security and recovery can be realized with limited means or effort.

What is claimed is:

1. Database system, comprising:
   a) storage means for storing encoded and compressed multidimensional array data;
   b) a storage interface;
   c) an application programming interface;
   d) processing means for effecting a storage and query processing, and for providing processed data to said storage interface or said application programming interface, said processing means comprising an encoder/decoder, a compressor/decompressor, a query processor, a query optimizer and a format converter;
   e) the provision of to be stored data to said storage interface through said processing means takes place in a storage format predetermined by an indicator assigned to the data;
   f) the provision of to be output data to said application programming interface through said processing means takes place in an output format predetermined by an indicator transmitted via said application programming interface; and
   g) said storage format, said output format and a predetermined internal format of the processing means for the processing of the data are respectively independent from one another.

2. Database system according to claim 1, wherein the provision to the application programming interface takes place selectively in an output format suitable for direct further processing by an application, or an output format arbitrarily selectable through said application programming interface.

3. Database system according to claim 1, wherein the provision to the application programming interface takes place selectively in an output format arbitrarily selectable through said application programming interface.

4. Database system according to claim 1, wherein the input of array data takes place via said application programming interface in an arbitrary data format.

5. Database system according to claim 1, wherein said application programming interface comprises a declarative interface for definition, storage, modification and retrieval of arrays.

6. Database system according to claim 1, wherein said storage means comprise a storage manager.

7. Method for processing multidimensional array data in a database system, comprising:
   a) transmitting an array input via an application programming interface and an input query to a processing unit;
   b) generating and optimizing a query plan from the input query;
   c) modifying the input array according to the query plan and translating the input array into a predetermined internal format of the processing unit;
   d) determining an array data or array partial data affected by the query plan, the array data or array partial data are stored in storage means of the database system;
   e) loading into the processing means, decoding and decompressing the determined array data or array partial data according to an indicator assigned to the data, generating a modified array data or array partial data from the data of the input array; and
   f) translating overwritten array data or array partial data into a storage format predetermined by an indicator assigned to the data and transferring the data to a storage interface.

8. Method according to claim 7, wherein the arrays are stored in the storage means divided into array partial data with assignment of an index, and said determining of the affected array data or array partial data takes place by means of the index.

9. Method according to claim 8, wherein compressing and encoding of array partial data of an array takes place independently from one another.

10. Method for processing multidimensional array data in a database system, comprising:
    a) transmitting an input query through an application programming interface to a processing unit;
    b) generating and optimizing a query plan on the basis of the input query;
    c) allocating a storage place for a resulting array obtained by the input query;
    d) determining an array data or array partial data affected by the query plan, the array data or array partial data are stored in storage means of the database system;
    e) loading into the processing unit, translating the determined array data or array partial data from a storage format predetermined by an indicator assigned to the data into a predetermined internal format of the processing unit, copying of relevant array partial data into a resulting array according to the query plan;
    f) effecting further operations according to the query plan;
    g) translating the resulting array data into an output format predetermined by an indicator transmitted via an application programming interface, in case the output format differs from the internal data format; and
    h) transmitting the resulting arrays to the application programming interface.

11. Method according to claim 10, wherein said translating comprises compressing and encoding the resulting array data.

12. Method according to claim 10, wherein the arrays are stored in the storage means divided into array partial data with assignment of an index, and said determining of the affected array data or array partial data takes place by means of the index.

13. Method according to claim 12, wherein the array partial data are tiles.

14. Method according to claim 12, wherein the index is a spatial index (geo-index).

* * * * *